Jan. 11, 1966 L. D. SWANTZ 3,229,165
ELECTRIC METER ADAPTER
Filed Feb. 11, 1963

LLOYD D. SWANTZ INVENTOR.

BY Donald W Canady

3,229,165
ELECTRIC METER ADAPTER
Lloyd D. Swantz, 202 Florence Ave., Anaheim, Calif.
Filed Feb. 11, 1963, Ser. No. 257,518
1 Claim. (Cl. 317—109)

The present invention relates to electric meter boxes and more particularly, relates to a means for adapting a previously installed meter box for usage with increased load capacity. In the prior art, when it was desired to add electrical service at an existing flush-type meter and breaker panel installation, it was necessary to either remove the existing electrical service and panel or to abandon the existing panel and in either case rewire a completely new breaker panel. In many installations even these methods were inadequate since the load wires could not be physically reached. As a result of these prior art practices the wall through which the existing service conduit passed had to be torn into to reach the load wires and to install a larger breaker panel. Where a wall containing a standard flush-type meter box was not disrupted there was no ready access to the existing electrical load.

It is, therefore, an object of the present invention to provide a means for converting an electrical meter box and panel for additional service.

It is also an object of the present invention to provide a meter adapter box useful in adding additional load capacity.

It is a further object of my present invention to provide a rain-tight electrical meter box which is adapted to convert a standard flush-type meter box into an exteriorly set embodiment.

Additional objects and a more complete understanding of my invention may be had by reference to the following specification and claim when taken in conjunction with the drawings wherein:

Figure 4:
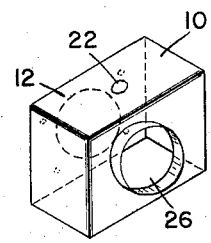
FIG. 4 is an isometric view of the adapter box of my present invention.

With reference to the drawings generally, an adapter box 10, as best shown in FIG. 4, is adapted to convert a standard flush-type meter box into an exteriorly set meter which is equipped for additional load service. A rear portion of the adapter box 10 may be knocked out, as at 12, so that the adapter box may be mechanically attached to the existing meter box, and whereby the wires from the existing breaker panel can be fed into the adapter box 10 to the meter at its new location.

Figure 1:
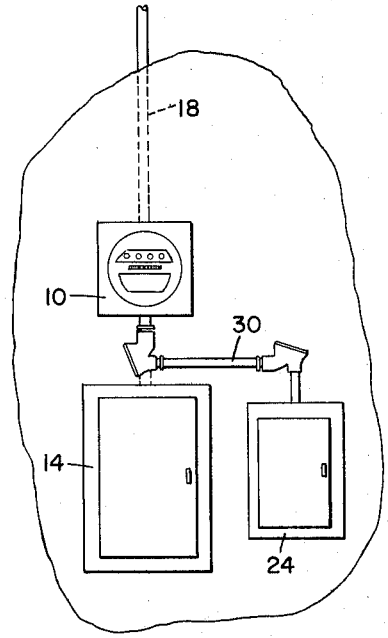
FIG. 1 is a front elevation of an adapted meter box installation using existing conduit in accordance with my present invention.
Figure 2:
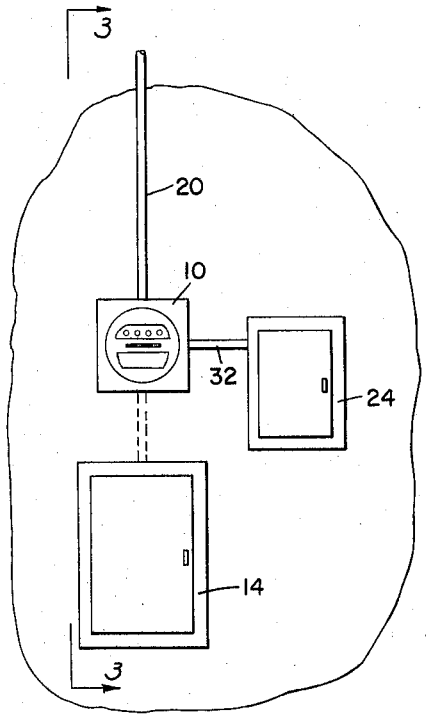
FIG. 2 is a front elevation of an adapted meter box installation using new conduit.
Figure 3:
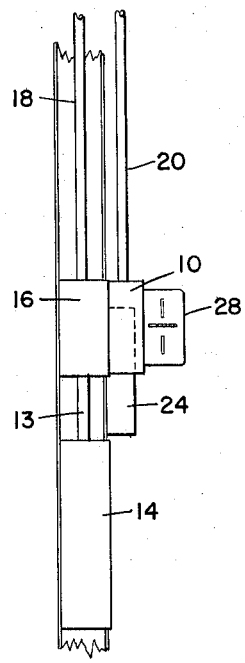
FIG. 3 is a side elevation of the apparatus shown in FIG. 2 and taken on line 3—3 of FIG. 2.

Referring more particularly to the drawings, FIG. 1 show an adapter box 10 adapted to convert a conventional flush-type meter which is wired through conduit 13 to breaker panel 14 to an exterior set type whereby additional load can be connected into the meter. This is done by attaching the adapter box 10 to the existing meter box at 16, as best viewed in FIG. 3. The apparatus of FIG. 1 represents an embodiment of my invention wherein additional load can be installed with the existing service or with the addition of additional service wire through the existing conduit. Additional service may be fed through the conduit 18 shown in FIG. 1 if the existing conduit is sufficiently large for the new service wire to be added. However, if the existing conduit is not sufficiently large, an additional service wire may be brought into the adapter box 10 in an exterior manner through a new conduit 20, as shown in FIGS. 2 and 3. The conduit 20 may be connected directly into the adapter box 10 through opening 22. An additonal breaker panel 24 is required to increase load capacity regardless of the need for a new conduit and may be exteriorly mounted adjacent the adapter 10.

In adapting an existing meter installation for additional service according to the present invention, the meter is first removed from its existing position and the wiring therefrom and spliced if necessary before reconnecting to the meter 28 in its new position on the adapter box at opening 26. The new load (not shown) is wired from new panel 24 which is wired to the meter 28 in its new position on adapter box 10 through exteriorly disposed conduits 30 and 32.

A meter box may be adapted for use with my present invention by knocking out hole 12 (FIG. 4) in the back of the meter box which hole is sufficiently large to facilitate fastening the adapter box over the existing meter receptacle. The adapter box may be fastened to the existing meter receptacle by any conventional means, for example by self tapping screws. Existing wiring for the meter is then accessible through the knocked out hole and can be spliced if necessary for connection to the meter which is to be reset, as previously set forth.

Although I have described my present invention with a certain degree of particularly, the scope of my invention is not to be limited to the details set forth, but should be given the full breadth of the appended claim.

I claim:
A meter box adapter arrangement to increase the load capacity of a flush meter installation on a wall, comprising in combination:
 a meter box for operatively receiving a meter, said meter box being mounted flush with respect to said wall,
 a first breaker panel installed flush with respect to said wall,
 an adapter box adapted to operatively house a meter, said adapter box being operatively attachable to said meter box exterior to said wall,
 means for attaching said adapter box to said meter box exterior to said wall,
 conduit means operatively connected to said adapter box exterior to said wall, through which additional electrical service may be installed through said meter housed on said adapter box,
 said adapter box having means for receiving meter connection wires from said meter box for connecting to said meter housed on said adapter box,
 a second breaker panel mounted exterior to said wall and adapted to provide circuit breakers for said incremental load capacity, and means for connecting said additional service to said second breaker panel.

References Cited by the Examiner
UNITED STATES PATENTS

| | | | |
|---|---|---|---|
| 1,511,636 | 10/1924 | Rypinski | 317—109 |
| 2,117,565 | 5/1938 | Mitchell | 317—108 X |
| 2,167,419 | 7/1939 | Heanes | 317—105 |

KATHLEEN H. CLAFFY, *Primary Examiner.*
JOHN F. BURNS, *Examiner.*